US008843790B2

(12) United States Patent
Chandran et al.

(10) Patent No.: US 8,843,790 B2
(45) Date of Patent: *Sep. 23, 2014

(54) DYNAMIC HARDWARE WATCHPOINT

(75) Inventors: Joshi Chandran, Chennai (IN); Shajith Chandran, Bangalore (IN); Manish Kulshreshtha, Tamil Nadu (IN); Dilip K. Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 13/559,712

(22) Filed: Jul. 27, 2012

(65) Prior Publication Data

US 2014/0032975 A1     Jan. 30, 2014

(51) Int. Cl.
*G06F 11/00*     (2006.01)

(52) U.S. Cl.
USPC .......................................... 714/47.1; 714/42

(58) Field of Classification Search
CPC ... G06F 11/30; G06F 11/302; G06F 11/3037; G06F 11/3051; G06F 11/3089; G06F 11/3096
USPC .............. 714/34, 35, 38.1, 42, 47.1, 6.13
See application file for complete search history.

(56) References Cited

U.S. PATENT DOCUMENTS

| | | | | |
|---|---|---|---|---|
| 5,193,180 A | * | 3/1993 | Hastings | 717/163 |
| 5,687,368 A | * | 11/1997 | Nilsen | 1/1 |
| 6,795,937 B2 | * | 9/2004 | Harris et al. | 714/42 |
| 7,711,988 B2 | * | 5/2010 | Zhou et al. | 714/30 |
| 7,788,535 B2 | | 8/2010 | Bussa et al. | |
| 8,321,626 B2 | * | 11/2012 | Hiremath et al. | 711/103 |
| 2002/0188813 A1 | | 12/2002 | Cheung et al. | |
| 2008/0127035 A1 | | 5/2008 | Lev et al. | |
| 2009/0187725 A1 | * | 7/2009 | Mencias et al. | 711/171 |
| 2009/0217095 A1 | | 8/2009 | Bussa et al. | |
| 2014/0082428 A1 | | 3/2014 | Chandran et al. | |

OTHER PUBLICATIONS

Chandran et al., "Dynamic Hardware Watchpoint," USPTO U.S. Appl. No. 14/082,117, filed Nov. 16, 2013, 27 pages.
Office action regarding USPTO U.S. Appl. No. No. 14/082,117 dated Mar. 24, 2014, 25 pages.
Notice of allowance regarding U.S. Appl. No. 14/082,117 dated May 21, 2014, 13 pages.

* cited by examiner

*Primary Examiner* — Scott Baderman
*Assistant Examiner* — Joseph Kudirka
(74) *Attorney, Agent, or Firm* — Yee & Associates, P.C.; Parashos Kalaitzis

(57) ABSTRACT

A method and apparatus for monitoring changes to a block of data is disclosed. A computer sets a first hardware watchpoint to monitor changes to the block of data at a current location of the block of data in memory and a second hardware watchpoint to monitor changes at a selected location in the memory where a reference to the block of data is located. Responsive to the second hardware watchpoint being triggered by a change at the selected location where the reference to the block of data is located, the computer identifies a new location of the block of data in the memory based on the change that triggered the second hardware watchpoint. Subsequent to identifying the new location of the block of data, the computer then resets the first hardware watchpoint to monitor changes to the block of data at the new location of the block of data.

9 Claims, 5 Drawing Sheets

COMPUTER MEMORY 200

| ADDRESS | VALUE | DESCRIPTION | |
|---|---|---|---|
| ffff-0000 | NA | BASE SEGMENT ADDRESS | 202 |
| ⋮ | ⋮ | ⋮ | |
| ffff-0132 | HELLO | STRING | 204 |
| ⋮ | ⋮ | ⋮ | |
| ffff-0160 | ffff-0132 | POINTER TO STRING | 206 |
| ⋮ | ⋮ | ⋮ | |
| ffff-f000 | HELLO | STRING AT NEW LOCATION | 208 |

DYNAMIC HARDWARE WATCHPOINT

BACKGROUND

1. Field

The disclosure relates generally to monitoring data in memory and in particular, to monitoring references in memory to data in memory. Still more particularly, the present disclosure relates to a method, apparatus, and computer program product for using hardware watchpoints to monitor changes to a block of data in memory and to a reference in memory to the block of data.

2. Description of the Related Art

Data processing systems provide computing resources, such as a computer that includes a central processing unit and computer memory. Executable programs are executed by the central processing unit in the computer using the computer memory. The executable programs store and use data in the form of data structures located in the computer memory. During execution of the executable programs the information located in these data structures may become corrupted by unforeseen errors in the executable programs. Responsive to the corruption of a data structure, a subsequent error is likely to occur at unexpected points of execution in the program.

Service teams are tasked with servicing errors in executable programs. Identifying an error in an executable program can be a difficult task for the service team. In particular, identifying an error of the type where a data structure has been corrupted can be very difficult. The reason for this difficulty is that the point in code where an error shows up is typically not the point in code where the data structure has been corrupted.

Executable programs also store and use pointers to data structures in the form of a reference located in the computer memory to the location in memory where the data structure is located. Through the use of a reference to a data structure, the data structure can be dynamically relocated. For example, during execution of an executable program a data structure can be copied to a new location and a reference to the data structure can be changed to point to the new location where the data structure has been copied.

To locate changes to data in memory some computers provide a mechanism called a hardware watchpoint. The hardware watchpoint monitors changes to data at a location in memory. However, because the data structure may be relocated during execution, a hardware watchpoint that is monitoring the location in memory where a data structure was previously located will not monitor changes to the data structure at a location where the data structure has been moved. Hardware watchpoints are fast but they have limits. For example, a computer will typically support only a small number of hardware watchpoints and the amount of memory a hardware watchpoint can watch is also limited.

Another mechanism that can be used to locate changes to data in memory is called a software watchpoint. Software watchpoints are not limited in the same ways as hardware watchpoints. Software watchpoints, however, are implemented by single stepping through an executable program and checking the software watchpoint at each step. Single stepping an executable program to process a software watchpoint will significantly slow down execution of the program. This slowdown can also change the sequence of operations of the executable program due to changes to the timing of the execution of the program. Changing the sequence and/or slowing down execution of the program can make errors un-reproducible and can also introduce different errors that would not normally show up during normal execution. Because of these problems, software watchpoints are not used in production environments where the executable program would otherwise become un-useable for its original intended purposes.

Therefore, it would be advantageous to have a method, apparatus, and computer program product that takes into account at least some of the issues discussed above, as well as possibly other issues.

SUMMARY

In one illustrative embodiment, a method, apparatus, and computer program product for monitoring changes to a block of data is provided. An apparatus sets a first hardware watchpoint to monitor changes to the block of data at a current location of the block of data in memory and a second hardware watchpoint to monitor changes at a selected location in the memory where a reference to the block of data is located. Responsive to the second hardware watchpoint being triggered by a change at the selected location where the reference to the block of data is located, the apparatus identifies a new location of the block of data in the memory based on the change that triggered the second hardware watchpoint. Subsequent to identifying the new location of the block of data, the apparatus then resets the first hardware watchpoint to monitor changes to the block of data at the new location of the block of data.

DETAILED DESCRIPTION

Figure 1:
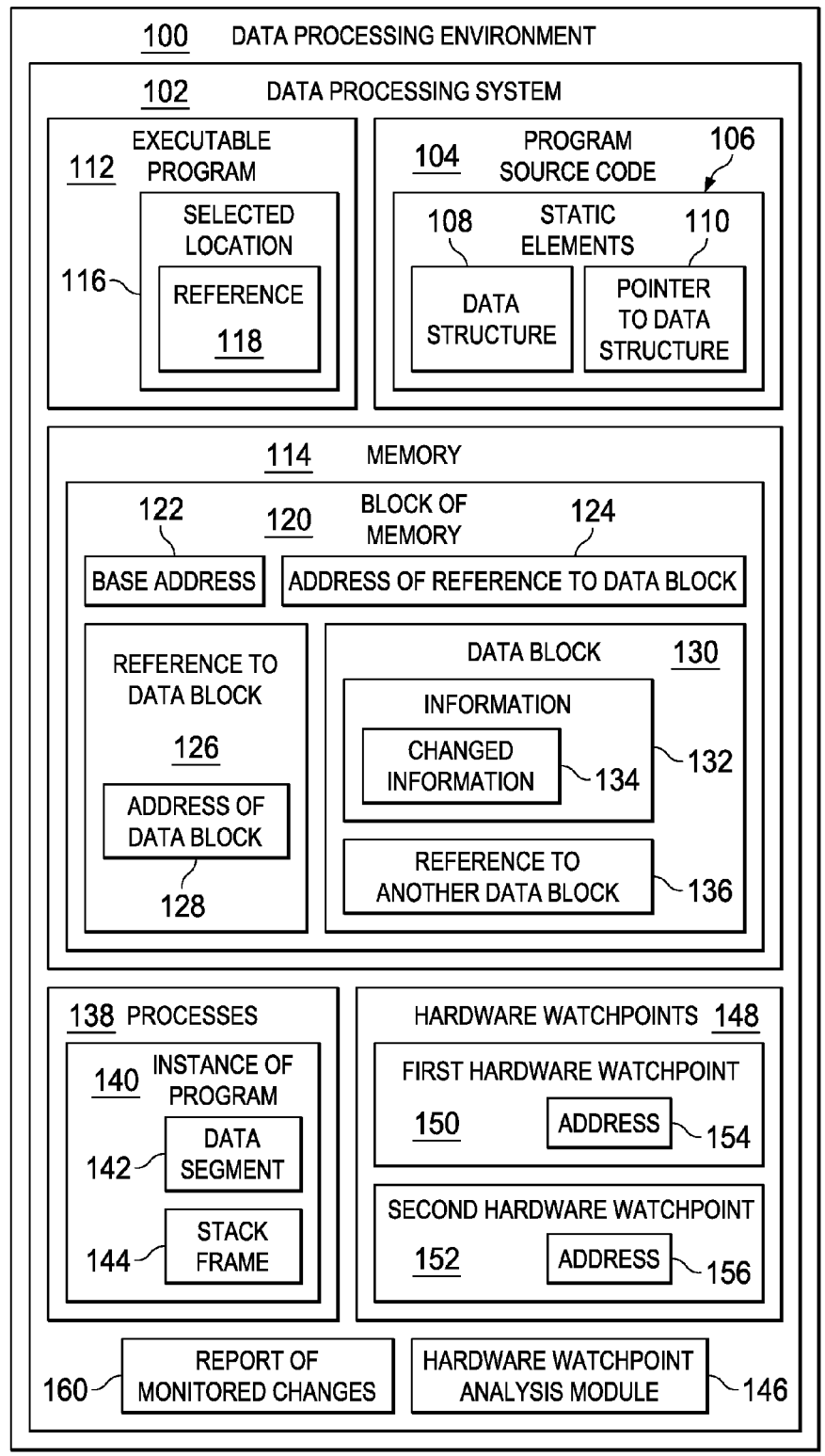
FIG. 1 is a block diagram of components involved in monitoring changes to a block of data in a processing environment in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustration of components involved in monitoring changes to a block of data in a processing environment is depicted in accordance with an illustrative embodiment. In this illustrative example, data processing system 102 is present in data processing environment 100. Data processing system 102 may comprise a set of computers. A "set," as used herein with reference to items, means one or more items. For example, "set of computers" is one or more computers. When more than one computer is present in data processing system 102, those computers may be in communication with each other. This communication may be facilitated through a medium such as a network. This network may be, for example, without limitation, a local area network, a wide area network, an intranet, the internet, and some other suitable type of network.

In these illustrative examples, program source code 104 may be located in data processing system 102. Program source code 104 may comprise a number of statically defined elements, such as static elements 106. Two examples of statically defined elements in static elements 106 include data structure 108 and pointer to data structure 110. Program source code 104 may be written in any programming language suitable for execution on data processing systems such as data processing system 102. For example, a programming language for program source code 104 may define syntax for creating data structures and pointers to the data structures in program source code 104. The syntax used to define data structures and pointers may vary significantly between different programming languages. For example, some object oriented programming languages may use classes instead of data structures. Still other programming languages may not explicitly support pointers such as pointer to data structure 110. In this example where pointers are not explicitly supported by the programming language, pointer to data structure 110 may instead be an implicit pointer, such as a reference to the data structure using a name of the data structure. In this example where the language syntax requires using references instead of pointers to data structures, a reference may implicitly point or refer to data structure 108 by name.

As depicted, data processing system 102 includes executable programs, such as executable program 112. In these illustrative examples, executable program 112 is a program running in data processing system 102. For example, executable program 112 may be executed by one or more processing units in one or more computers in data processing system 102 using memory 114. Executable program 112 uses data in the form of instances of data structures, such as an instance of data structure 108. Executable program 112 also uses references to data structures in the form of instances of pointers, such as an instance of pointer to data structure 110. In these illustrative examples, instances of data structures and instances of pointers to data structures are located in memory 114 at selected locations such as selected location 116. For example, when executable program 112 is executing in data processing system 102, executable program 112 comprises selected location 116. In this example, selected location 116 is a location in memory 114 where reference 118 is located. Reference 118 is an instance of pointer to data structure 110 in these illustrative examples.

Through the use of reference 118 an instance of data structure 108 referred to by reference 118 can be dynamically relocated from a current location in memory 114 to a new location in memory 114. For example, during execution of executable program 112 an instance of data structure 108 in a current location in memory 114 can be copied to a new location in memory 114. In this example, subsequent to copying the instance of data structure 108 to the new location, reference 118 is modified to point to the new location where the data structure has been copied.

In these illustrative examples, memory 114 may contain one or more blocks of memory such as block of memory 120. As depicted, block of memory 120 has base address 122. Base address 122 is the address in memory 114 where block of memory 120 where is located. For example, base address 122 of block of memory 120 may be an address in memory 114 of a data segment allocated to an instance of executable program 112 running in data processing system 102. As another example, base address 122 may be an address in memory 114 of a stack frame allocated for use by a function in an instance of executable program 112 running in data processing system 102.

As depicted, block of memory 120 may comprise address of reference to data block 124 which points to reference to data block 126. In these illustrative examples, reference to data block 126 is an instance of pointer to data structure 110. As also depicted, reference to data block 126 comprises address of data block 128. In these illustrative examples, address of data block 128 is the address where data block 130 is currently located. In these illustrative examples, data block 130 is an instance of data structure 108. As further depicted, data block 130 comprises information 132. In these illustrative examples, information 132 may include changed information 134. For example, during execution of executable program 112 the information stored at the location in memory where data block 130 is currently located may change, thus forming changed information 134 in information 132. As depicted, data block 130 may also comprise references, such as reference to another data block 136. For example, the information stored at the location in memory where data block 130 is currently located may comprise reference to another data block 136, such as another instance of data block 130 at another location in memory 114.

Processes 138 are instances of executable programs in a data processing system, such as data processing system 102. In these illustrative examples, instance of program 140 is an instance of executable program 112. Data segment 142 is a block of memory, such as block of memory 120. Data segment 142 is used by instance of program 140 for allocating instances of data structures, such as data block 130. Instances of data blocks allocated to data segment 142 may be used by all processes that are given access to data segment 142. For example, data segment 142 may be a globally accessible data segment that is shared by two or more instances of executable program 112. As another example data segment 142 may be a process scoped data segment that is accessable only by functions within a particular instance of executable program 112. Stack frame 144 for instance of program 140 is also a block of memory, such as block of memory 120. Stack frames, such as stack frame 144, are used by instance of program 140 for allocating instances of data structures, such as data block 130.

Stack frames, such as stack frame 144, are allocated when a function is called. Each subsequent function call allocates a new stack frame and places the new stack frame on top of the previously allocated stack frames creating a stack of stack frames. When a function completes its operations, the stack frame allocated for the function call is removed from the stack and returned for re-use. Instances of data blocks may be allocated in stack frame 144 when a function is called. When the function call returns freeing up the stack frame for re-use, the instances of data blocks allocated in stack frame 144 are also freed up for re-use.

In these illustrative examples, hardware watchpoint analysis module 146 is present in data processing system 102 and uses hardware watchpoints 148 to watch locations in memory for changes to data. As depicted, hardware watchpoints 148 comprise first hardware watchpoint 150 and second hardware watchpoint 152. As also depicted, first hardware watchpoint 150 includes address 154 and second hardware watchpoint 152 includes address 156. Address 154 is the location in memory that first hardware watchpoint 150 monitors for a change to information stored at address 154. Address 156 is the location in memory that second hardware watchpoint 152 monitors for a change to information stored at address 156. For example, in a process for monitoring changes to a block of data hardware watchpoint analysis module 146 may store the address for an instance of data block 130 in memory into address 154 and an address of an instance of reference to data block 130, such as reference to data block 126, in address 156.

For example, a user of hardware watchpoint analysis module 146 may use hardware watchpoint analysis module 146 to monitor changes to instances of a data structure. In this example, subsequent to requesting hardware watchpoint analysis module 146 monitor for changes to an instance of data structure 108, hardware watchpoint analysis module 146 may identify when executable program 112 is executing in data processing system 102 an instance of program 140. Subsequent to identifying instance of program 140, hardware watchpoint analysis module 146 may then identify an allocation of an instance of data structure 108 as data block 130 and an allocation of instance of pointer to data structure 110 as reference to data block 126. The identification of data block 130 and reference to data block 126 may be based on hardware watchpoint analysis module 146 monitoring for the allocations, receiving a notification that data block 130 has been allocated, retrieving information from selected location 116, and by any other suitable means. Further in this example, subsequent to the identification of data block 130 and reference to data block 126 hardware watchpoint analysis module 146 may monitor for changes to data block 130 and reference to data block 126 by setting hardware watchpoints 148. Still further in this example, subsequent to a dynamic relocation of data block 130 from a current location in memory 114 to a new location in memory 114, hardware watchpoint analysis module 146 may reset hardware watchpoints 148 to adjust for the dynamic relocation of data block 130 by setting hardware watchpoints 148 to watch the location where data block 130 has been moved.

As depicted, hardware watchpoint analysis module 146 may generate report of monitored changes 160. For example, hardware watchpoint analysis module 146 may set address 154 to an instance of data block 130 and also set address 156 to an instance of reference to data block 130. In this example, responsive to first hardware watch point 150 or second hardware watch 152 point being triggered by a change to data in memory 114, hardware watchpoint analysis module 146 may generate report of monitored changes 160. In these illustrative examples, report of monitored changes 160 may include identification information for data processing system 102, data processing environment 100, the process in processes 138 that made the change to data in memory 114, an identification of the data block or reference that was being monitored, the data that was changed, what the data has been changed to, and any other available information that is suitable for reporting monitored changes to memory used by executable program 112.

The illustration of data processing environment 100 in FIG. 1 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these functional components may be combined, divided, or combined and divided into different blocks when implementing an illustrative embodiment.

For example data processing system 102 may be a local area network (LAN), a wide area network (WAN), an intranet, the Internet, or some combination thereof. As another example, additional hardware watch points may be used to monitor for other changes at other locations in memory, such as data segment 142, base address 122, reference to another data block 136, and other suitable locations. In this example, all intervening references in memory 114 that point to a data block being monitored, such as data block 130, are assigned a hardware watchpoint, if one is available, to identify changes to the physical location of the data block being monitored and the physical location of references pointing to the data block being monitored. As still another example, in a failover process where a block of memory in the memory of failing application is being transferred to another instance of the application it would be advantageous to reset hardware watchpoints in the failover instance. In this example, it would be advantageous to watch for instances where the base address of a block of memory, such as block of memory 120 is changing to identify when the block of memory 120 is being moved to the failover instance.

Figures 2, 6:
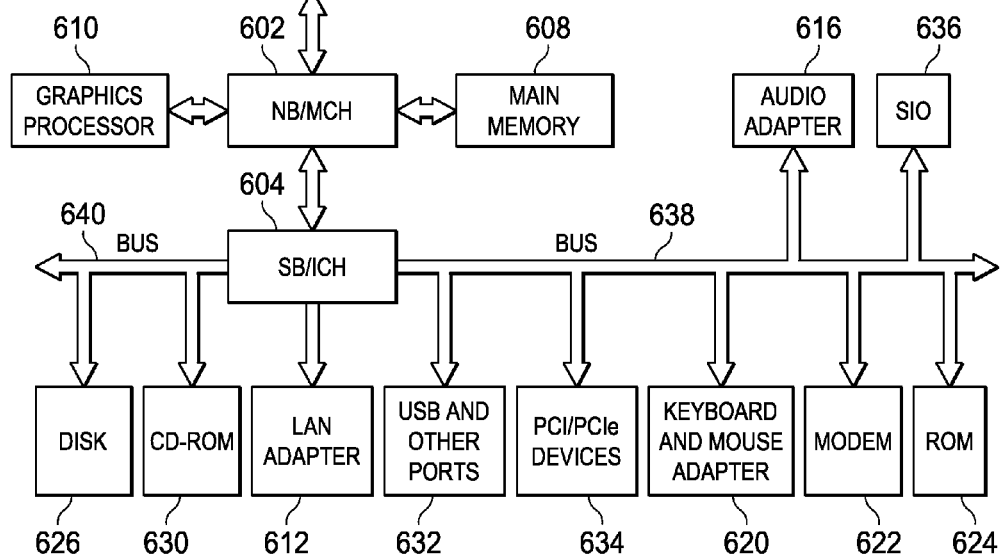
FIG. 2 is a table showing an example of the contents of memory involved in a process for monitoring changes to a block of data in the memory in accordance with an illustrative embodiment.
FIG. 6 is an illustration of a data processing system in accordance with an illustrative embodiment.

Turning next to FIG. 2, an illustrative example of the contents of memory involved in a process for monitoring changes to a block of data in the memory is depicted in table form in accordance with an illustrative embodiment. Computer memory 200 is an example of memory 114 in FIG. 1. In particular, base segment address 202 is an example of base address 122 in FIG. 1 of block of memory 120 in FIG. 1 for data segment 142 in FIG. 1 for instance of program 120 in FIG. 1. More particularly, string 204 is an example an instance of data structure 108 in FIG. 1. Still more particularly, pointer to string 206 is an example of an instance pointer to data structure 110 in FIG. 1.

In this illustrative example, string 204 is a data structure comprising a string which is also known as an array of characters. As depicted, the contents of string 204 are stored at address ffff-0132 in computer memory 200 and comprise the word "HELLO." As also depicted, the contents of pointer to string 206 is located at address ffff-0160 in computer memory 200 and comprise the value ffff-0132 which is the address where string 204 is located.

As depicted, a process for monitoring for changes to memory where string 204 is located may also include monitoring for changes to memory where pointer to string 206 is located. For example, to monitor for changes to string 204 a process may set a first hardware watchpoint to ffff-0132 to monitor for changes to string 204 and a second hardware watchpoint to ffff-0160 to identify if string 204 has been moved. In this example, subsequent to a change to the value of pointer to string 206 at address ffff-0160, such as the value changing from ffff-0132 to ffff-f000, the process for monitoring for changes to memory may reset the second hardware watch point for address ffff-0132 to ffff-f000. Thus, when string 204 has been moved or copied to string at new location 208 any changes to the value "HELLO" may still be monitored even though it has moved to a new location. For example, responsive to the string "HELLO" at address ffff-f000 changing to read "HELP" at address ffff-f000 the change will be identified by the process even through the change did not happen at the location ffff-0132 where the string "HELLO" was originally located.

Figure 3:
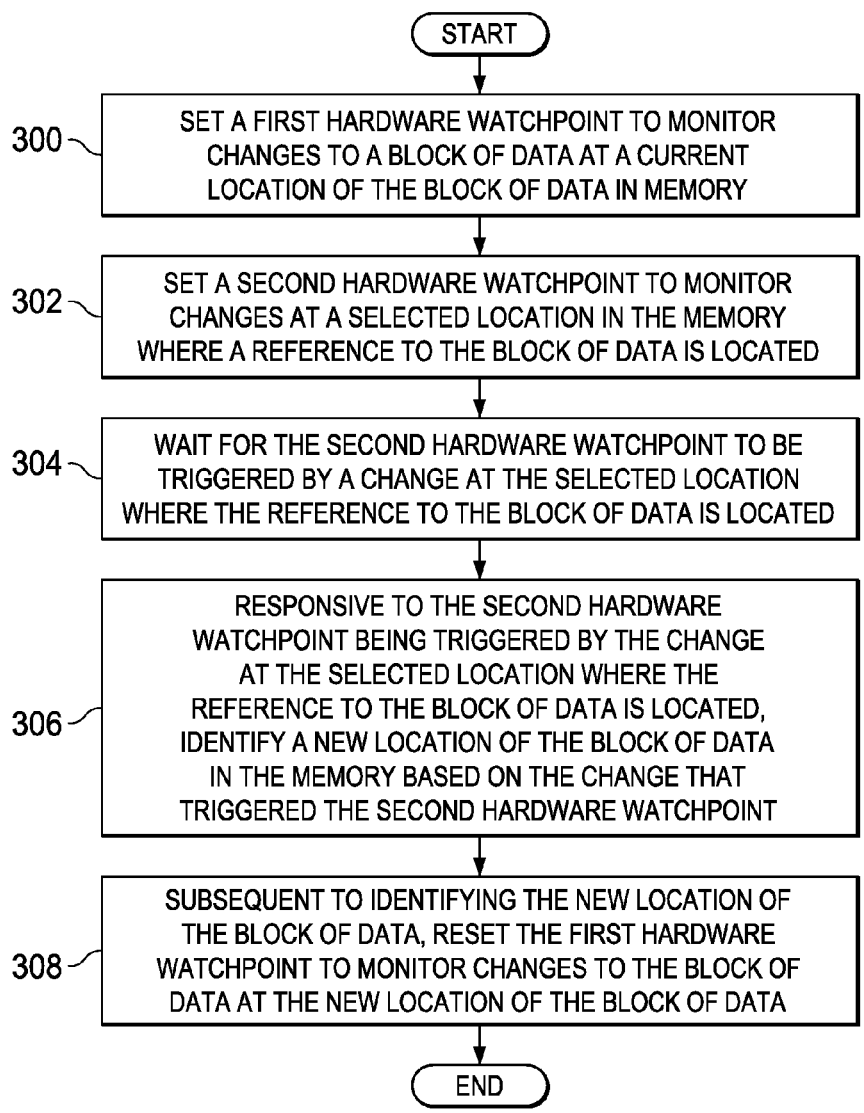
FIG. 3 is a flow chart of a process for monitoring changes to a block of data in accordance with an illustrative embodiment.

With reference now to FIG. 3, an illustrative example of a flowchart of a process for monitoring changes to a block of data is depicted in accordance with an illustrative embodiment. The steps in FIG. 3 may be implemented in data processing environment 100 in FIG. 1. In particular, the steps may be implemented in software, hardware, or a combination of the two hardware watchpoint analysis module 146 in FIG. 1 in data processing system 102 in FIG. 1.

The process begins by setting a first hardware watchpoint to monitor changes to a block of data at a current location of the block of data in memory (step 300). The process sets a second hardware watchpoint to monitor changes at a selected location in the memory where a reference to the block of data is located (step 302). The process then waits for the second hardware watchpoint to be triggered by a change at the selected location where the reference to the block of data is located (step 304). Responsive to the second hardware watchpoint being triggered by the change at the selected location where the reference to the block of data is located, the process identifies a new location of the block of data in the memory based on the change that triggered the second hardware watchpoint (step 306). Subsequent to identifying the new location of the block of data, the process resets the first hardware watchpoint to monitor changes to the block of data at the new location of the block of data (step 308).

Figure 4:
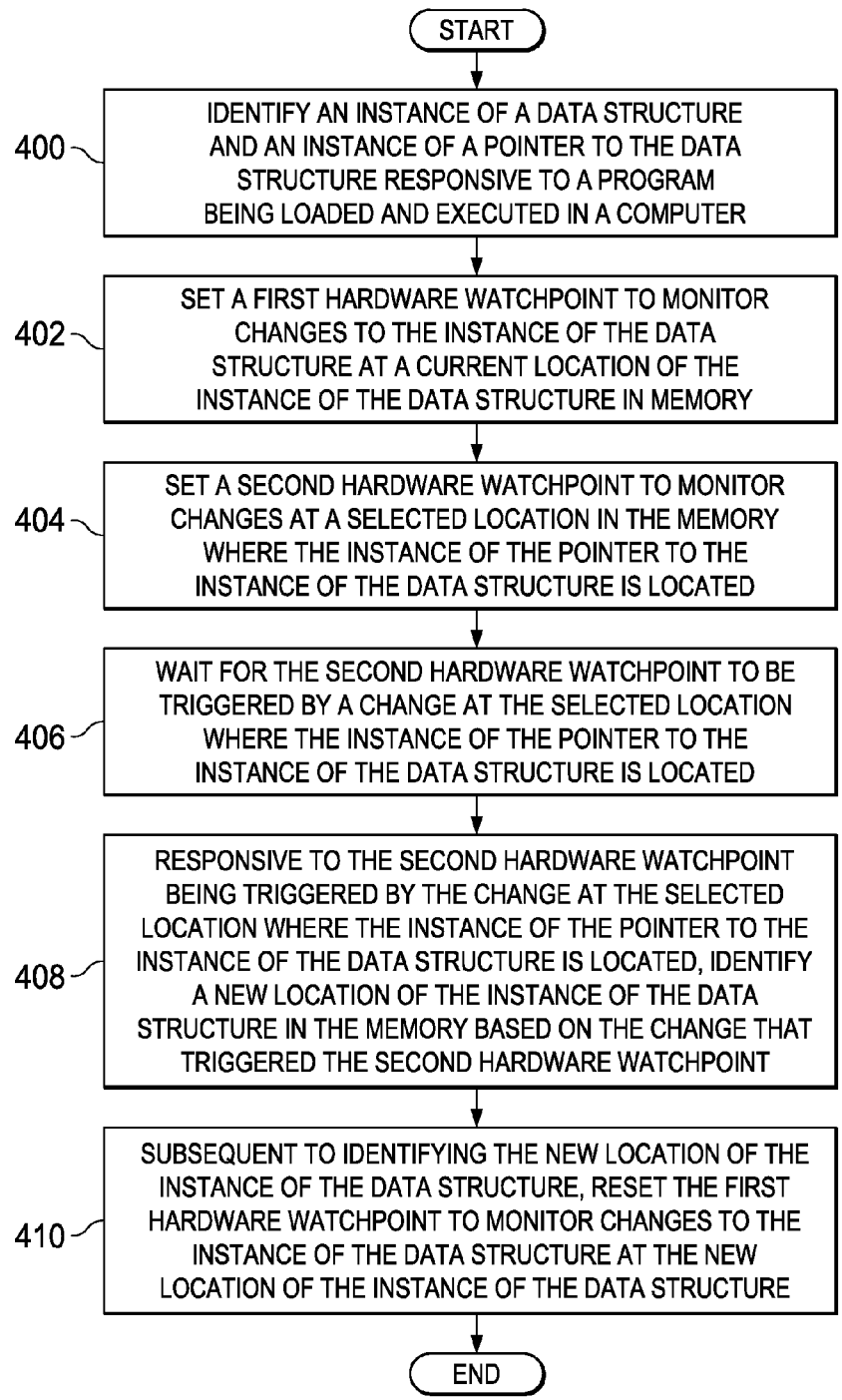
FIG. 4 is a flow chart of a process for monitoring changes to an instance of a data structure in accordance with an illustrative embodiment.

With reference now to FIG. 4, an illustrative example of a flowchart of a process for monitoring changes to an instance of a data structure is depicted in accordance with an illustrative embodiment. The steps in FIG. 4 may be implemented in data processing environment 100 in FIG. 1. In particular, the steps may be implemented in software, hardware, or a combination of the two hardware watchpoint analysis module 146 in FIG. 1 in data processing system 102 in FIG. 1.

The process begins by identifying an instance of a data structure and an instance of a pointer to the data structure responsive to a program being loaded and executed in a computer (step 400). The process sets a first hardware watchpoint to monitor changes to the instance of the data structure at a current location of the instance of the data structure in memory (step 402). The process also sets a second hardware watchpoint to monitor changes at a selected location in the memory where the instance of the pointer to the instance of the data structure is located (step 404). The process then waits for the second hardware watchpoint to be triggered by a change at the selected location where the instance of the pointer to the instance of the data structure is located (step 406).

Responsive to the second hardware watchpoint being triggered by the change at the selected location where the instance of the pointer to the instance of the data structure is located, the process identifies a new location of the instance of the data structure in the memory based on the change that triggered the second hardware watchpoint (step 408). Subsequent to identifying the new location of the instance of the data structure, the process resets the first hardware watchpoint to monitor changes to the instance of the data structure at the new location of the instance of the data structure (step 410).

Figure 5:
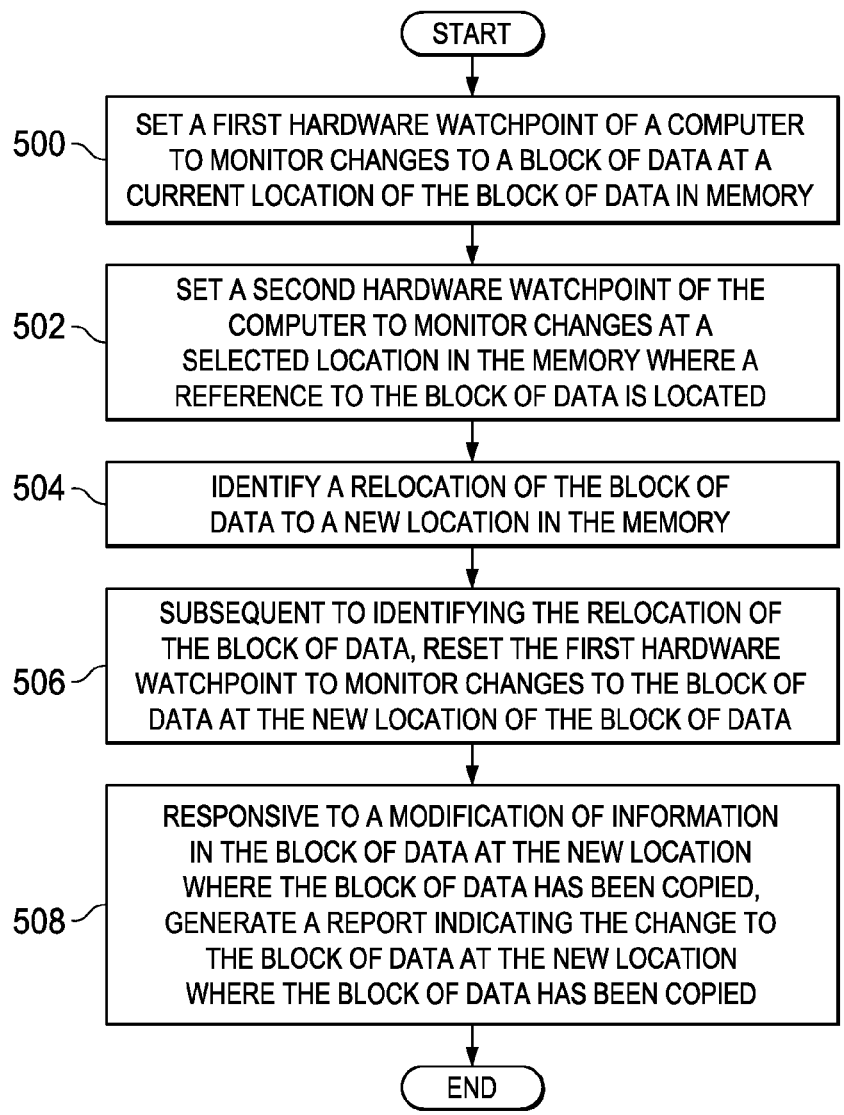
FIG. 5 is a flow chart of a process for monitoring changes to a block of data in accordance with an illustrative embodiment.

With reference now to FIG. 5, an illustrative example of a flowchart of a process for monitoring changes to a block of data is depicted in accordance with an illustrative embodiment. The steps in FIG. 5 may be implemented in data processing environment 100 in FIG. 1. In particular, the steps may be implemented in software, hardware, or a combination of the two hardware watchpoint analysis module 146 in FIG. 1 in data processing system 102 in FIG. 1.

The process begins by setting a first hardware watchpoint of a computer to monitor changes to a block of data at a current location of the block of data in memory (step 500). The process also sets a second hardware watchpoint of the computer to monitor changes at a selected location in the memory where a reference to the block of data is located (step 502). The process identifies a relocation of the block of data to a new location in the memory (step 504).

Subsequent to identifying the relocation of the block of data, the process resets the first hardware watchpoint to monitor changes to the block of data at the new location of the block of data (step 506). Responsive to a modification of information in the block of data at the new location where the block of data has been copied, the process then generates a report indicating the change to the block of data at the new location where the block of data has been copied (step 508) with the process terminating thereafter.

Referring to FIG. 6, a block diagram of a computer or data processing system is shown in which aspects of the present invention may be implemented. This system is an example of a computer which may be used to implement components of FIG. 1, such as hardware watchpoint analysis module 146, data processing system 102, and processes 138, and in which computer usable code or instructions implementing the processes for embodiments of the present invention may be located.

In the depicted example, the data processing system of FIG. 6 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, disk 626, CD-ROM 630, universal serial bus (USB) ports and other communication ports 632, and PCI/PCIe devices 634 connect to SB/ICH 604 through bus 638 and bus 640. PCI/PCIe devices 634 may include, for example, Ethernet adapters, add-in cards, and PC cards for notebook computers. PCI uses a card bus controller, while PCIe does not. ROM 624 may be, for example, a flash binary input/output system (BIOS).

Disk 626 and CD-ROM 630 connect to SB/ICH 604 through bus 640. Disk 626 and CD-ROM 630 may use, for example, an integrated drive electronics (IDE) or serial advanced technology attachment (SATA) interface. Super I/O (SIO) device 636 may be connected to SB/ICH 604.

An operating system runs on processing unit 606 and coordinates and provides control of various components within the data processing system of FIG. 6. As a client, the operating system may be a commercially available operating system such as Microsoft® Windows® (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on the data processing system (Java is a trademark of Sun Microsystems, Inc. in the United States, other countries, or both).

As a server, the data processing system of FIG. 6 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). The data processing system may be a symmetric multiprocessor (SMP) system including a plurality of processors in processing unit 606. Alternatively, a single processor system may be employed.

Instructions for the operating system, the object-oriented programming system, and applications or programs are located on storage devices, such as disk 626, and may be loaded into main memory 608 for execution by processing unit 606. The processes for embodiments of the present invention are performed by processing unit 606 using computer usable program code, which may be located in a memory such as, for example, main memory 608, ROM 624, or in one or more peripheral devices, such as, for example, disk 626 and CD-ROM 630.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Thus, illustrative embodiments of the present invention provide a computer implemented method, data processing system, and computer program product for monitoring changes to a block of data.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for monitoring changes to a block of data, the method comprising:
    setting, by a computer, a first hardware watchpoint to monitor changes to the block of data at a current location of the block of data in memory and a second hardware watchpoint to monitor changes at a selected location in the memory where a reference to the block of data is located, wherein the reference to the block of data is a first reference to the block of data in a plurality of references in the memory that points to the block of data or to a second reference in the plurality of references, selectively;
    responsive to the second hardware watchpoint being triggered by a first change at the selected location where the reference to the block of data is located, identifying, by the computer, a new location of the block of data in the memory based on the first change that triggered the second hardware watchpoint;
    subsequent to identifying the new location of the block of data, resetting, by the computer, the first hardware watchpoint to monitor changes to the block of data at the new location of the block of data;
    setting, by the computer, additional hardware watchpoints to monitor changes to each location in the memory pointed to by each of the plurality of references; and
    responsive to one or more of the additional hardware watchpoints being triggered by a second change in the memory, resetting, by the computer, each of the additional hardware watchpoints affected by the second change to continue monitoring changes to each location in the memory pointed to by each of the plurality of references.

2. The method of claim 1, wherein the block of data is an instance of a data structure, the reference is an instance of a pointer to the instance of the data structure, and the data structure and the pointer are statically defined elements in a program, and further comprising:
    identifying, by the computer, the instance of the data structure and the instance of the pointer to the data structure responsive to the program being loaded and executed in the computer.

3. The method of claim 1, wherein the block of data and the reference to the block of data are located in one or more blocks of memory in the computer.

4. The method of claim 3, wherein the one or more blocks of memory in the computer are allocated to a particular instance of a program in the computer.

5. The method of claim 3, wherein the one or more blocks of memory in the computer are located in a portion of memory shared between two or more processes in the computer.

6. The method of claim 1, wherein the selected location, where the reference to the block of data is located, is an offset to the reference from a base address of a block of memory.

7. The method of claim 6, wherein the block of memory is one of a stack frame of a program and a data segment of an instance of a program running in the computer.

8. The method of claim 6, wherein the block of memory is shared by a plurality of programs running in the computer.

9. The method of claim 1, further comprising:
    responsive to a modification of information in the block of data at the new location of the block of data, the computer generating a report indicating that the computer has monitored a change to the block of data at the new location of the block of data.

* * * * *